United States Patent [19]

Boyles et al.

[11] Patent Number: 5,232,198
[45] Date of Patent: Aug. 3, 1993

[54] METHOD AND APPARATUS FOR REMOTELY CONTROLLING A ROTARY VALVE OR THE LIKE

[75] Inventors: Jackie R. Boyles, Sugar Land, Tex.; Joseph L. Porter, Destreham, La.; Albert P. Richter, Jr., Houston, Tex.

[73] Assignee: Texaco Inc., White Plains, N.Y.

[21] Appl. No.: 875,467

[22] Filed: Apr. 29, 1992

Related U.S. Application Data

[63] Continuation-in-part of Ser. No. 740,748, Aug. 6, 1991, Pat. No. 5,156,373.

[51] Int. Cl.$^5$ ............................................. F16K 31/05
[52] U.S. Cl. .................... 251/129.12; 251/129.03; 251/129.04; 137/554
[58] Field of Search ................... 251/129.12, 129.11, 251/205, 129.04, 129.03; 137/554

[56] References Cited

U.S. PATENT DOCUMENTS

| | | | |
|---|---|---|---|
| 4,407,326 | 10/1983 | Wilhelm | 251/129.12 X |
| 4,759,386 | 7/1988 | Grouw, III | 251/129.12 X |
| 4,798,227 | 1/1989 | Goodwin | 137/554 |
| 4,840,350 | 6/1989 | Cook | 251/129.12 X |
| 4,926,903 | 5/1990 | Kawai | 137/554 |

*Primary Examiner*—Arnold Rosenthal
*Attorney, Agent, or Firm*—James L. Bailey; Jack H. Park; Russell J. Egan

[57] ABSTRACT

A rotary actuated valve choke or the like is remotely controlled by motor means fixedly mounted with respect to said valve to rotationally drive a stem thereof. Monitoring means measure the rotation of the motor and/or its associated drive train. The monitoring means convert the rotary motion to a more easily measurable linear motion to measure the valve setting and appropriately control the energization of the motor in response thereto.

5 Claims, 2 Drawing Sheets

5,232,198

METHOD AND APPARATUS FOR REMOTELY CONTROLLING A ROTARY VALVE OR THE LIKE

CROSS REFERENCE TO RELATED PATENT APPLICATION

The present application is a continuation-in-part of our earlier patent application Ser. No. 07/740,748 filed Aug. 6, 1991, U.S. Pat. No. 5,156,373, dated Oct. 20, 1992.

BACKGROUND OF THE INVENTION

1. The Field of the Invention

The present invention relates to a method and apparatus for controlling a rotary actuated valve or the like from a remote location and, in particular, to a method and apparatus which controls the rotary actuated device in such fashion as to permit it to be set, closed or set to a new position, and reset to any previous position with precision.

2. The Prior Art

The present invention finds use in the field of petroleum production and, in particular, to the servicing of gas wells located at offshore platforms. Offshore gas recovery platforms have a number of unique requirements including the ability to be rapidly shut down should the platform be threatened by an approaching weather system. Heretofore, it would have been necessary for production workers to attend to physically closing each of the valves on each of the production platforms. This effort would entail a substantial interruption in production considering the fact that the production rigs are often spaced a good distance apart and that there may be a number of valves on each platform each of which has to be closed in view of the approaching storm. A similar delay would be encountered in resetting the valves when the storm is no longer a threat. There would also be problems attendant with resetting each valve to its previous setting since there may be a delay until metering means indicates that the desired flow rates have been achieved.

Gas recovery operations have production quotas which require the appropriate periodic setting and resetting of the valves to achieve the various specified flow rates. Normally this would require the intervention of production personnel at each of the production platforms adjusting and resetting each of the several valves manually. Often each resetting operation is accompanied by the previously mentioned time delay while the flow is monitored to assure that the correct setting has been achieved.

There are known systems for controlling valves, but these systems are primarily of the linear type where the valve or choke is controlled by pneumatic or hydraulic cylinders operatively driving a reciprocating ram. The ram is opposed by spring bias means which act, in the absence of the control means, to drive the valve or choke to a fully closed position. The primary difficulty with these types of known devices is, should there be a failure of the hydraulic or air pressure, then the entire system will experience a shutdown. The failure of system pressure for even the briefest interval, as well as failure by a drop in pressure below system tolerances, could result in the unintentional and undesirable shutdown of the entire production system. Another disadvantage of the fluid actuated systems is that they require pressurization at all times thereby necessitating that there must be an on site source of pressurization for the fluid.

The present invention overcomes many of the difficulties experienced with the prior art devices by providing a system which allows control of rotary actuated valves, chokes or similar control devices from a remote location and with great precision in the setting and resetting of the valve, choke or other control device. A particular advantage of the present invention is that it can be added to existing production equipment without any substantial interruption of operations or undue capital expense. Thus the present invention makes a significant contribution to upgrading and automation of a functioning production facility with minimal interruption of operation of the facility.

SUMMARY OF THE INVENTION

The present invention is intended for use with a conventional rotary actuated valve, choke, or like control device and comprises a frame secured to the valve and supporting a gear motor coupled to a shaft of the valve by a gear reduction train and a sliding coupling. Monitoring means are coupled to the motor or drive train and, by monitoring their movements, are used to determine the relative position or setting of the valve. The motor is used to drive the valve to the desired setting which can be closed, open to a previous setting or to an entirely new setting. The subject invention also included a manual override to control the valve.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
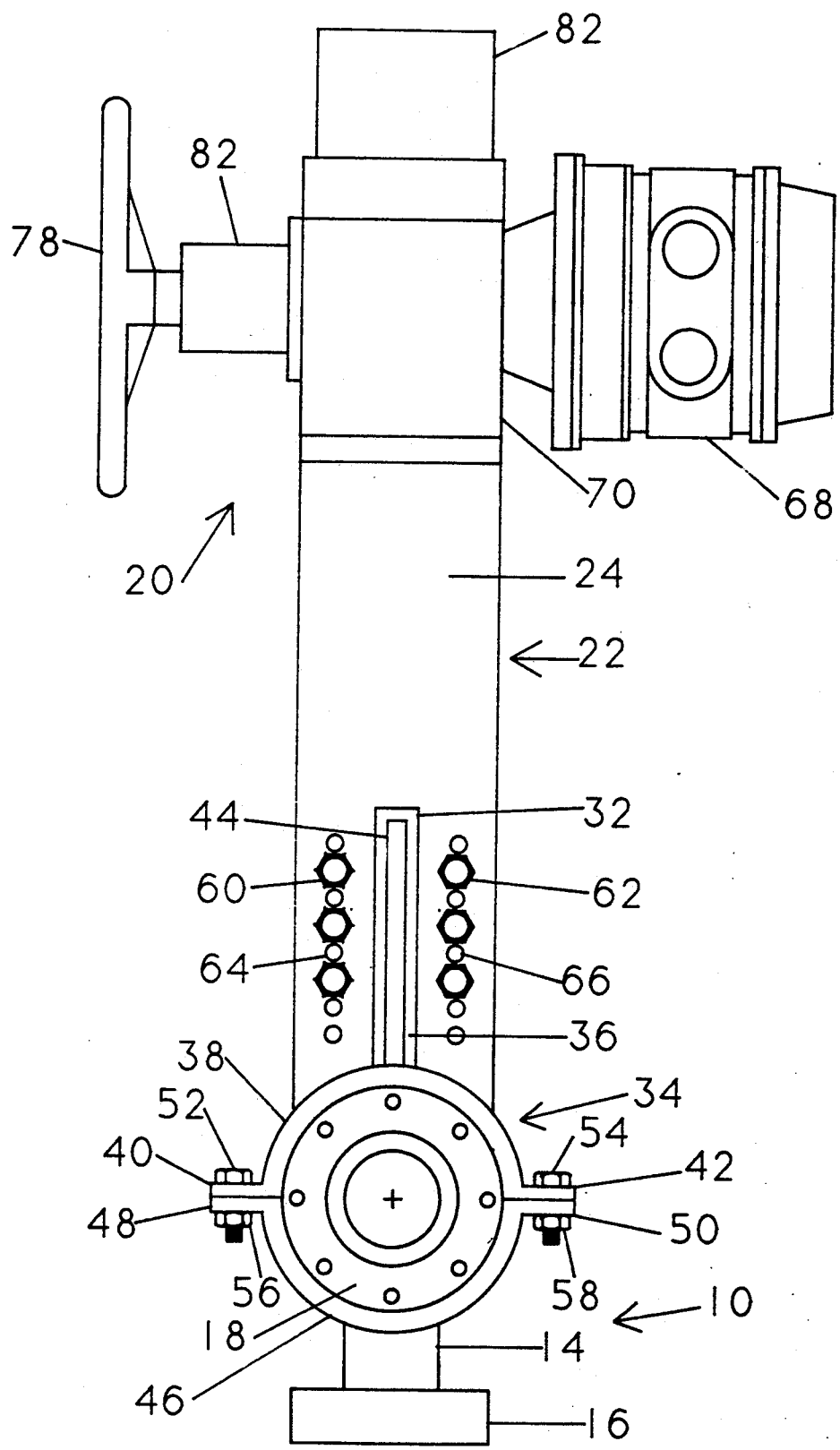
FIG. 1 is a front elevation of the present invention mounted on a known gas well choke or rotary valve.
Figure 2:
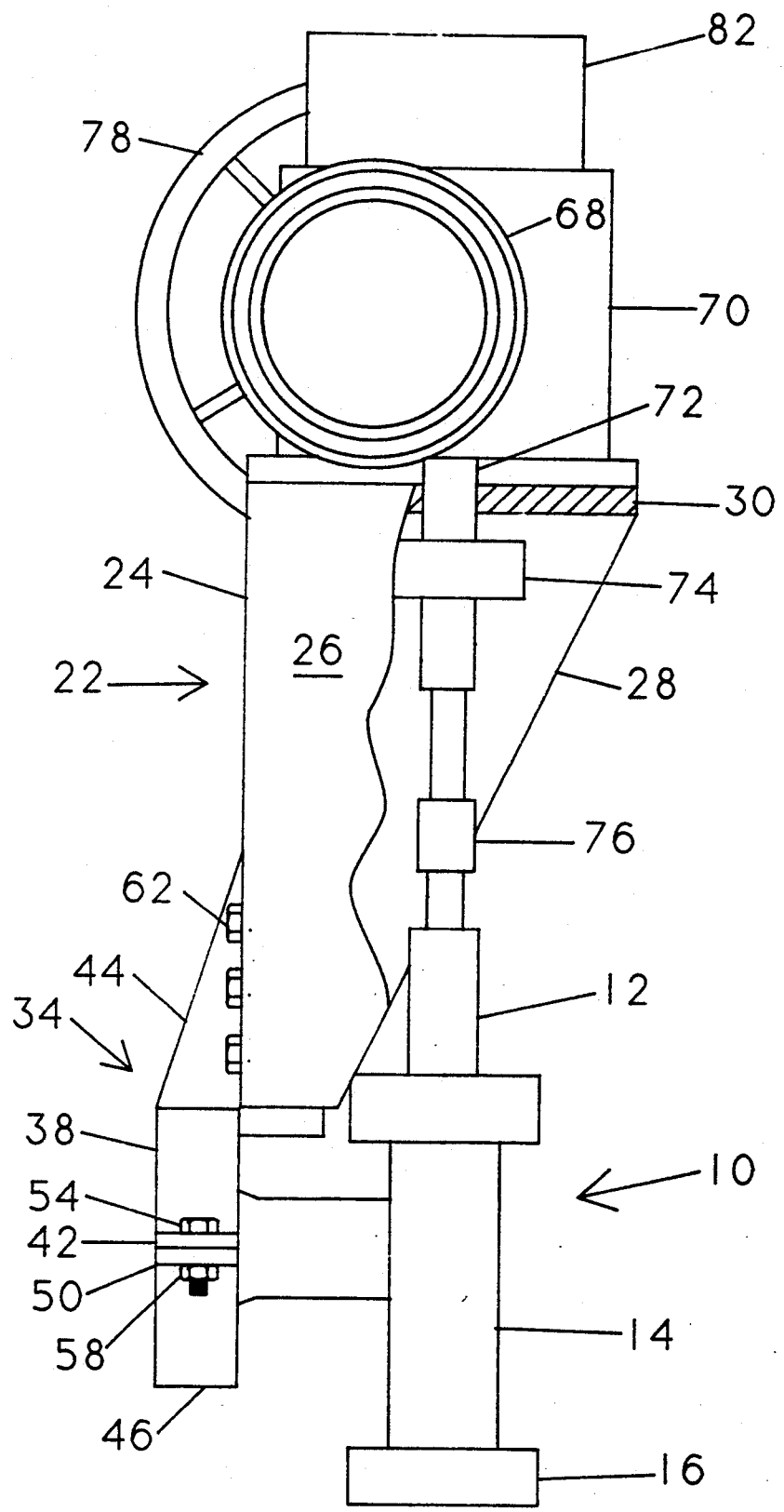
FIG. 2 is a side elevation, partially broken away and partially in section, of the subject invention shown in FIG. 1.

The present invention used in combination with a known production choke or valve 10 having a rotary spindle 12 extending from housing 14 containing a throttling member (not shown). The movement of the throttling member within the housing is controlled by rotation of the spindle in known fashion. The housing 14 has first and second flanged ends 16, 18 which are generally normal to each other and are respectively connected to well and production piping (neither of which has been shown).

The subject invention 20 is mounted on the valve 10 and has a first housing member 22 formed by a front wall 24, parallel spaced side walls 26, 28 extending rearwardly of the front wall, and top wall 30. The respective walls of the first housing member are fixed together to define a generally rectangular construction open along a rearwardly directed bias. The front wall 24 is also provided with a slot 32 centered at its lower edge. A second housing member 34 is formed by a mounting plate 36, an upper semi cylindrical clamp portion 38 extending normal to the surface of the mounting plate 36 with flanges 40, 42 extending outwardly from the lower free ends thereof. A brace bracket 44 tapers from the upper clamp portion 38 to the mounting plate 36 and is normal to the latter. A lower semi cylindrical clamp member 46 likewise is provided with radially extending flanges 48, 50 and the upper and lower clamp portions are secured together by bolts 52, 54 and nuts 56, 58. The first and second housing members are adjustably secured together by bolts 60, 62 (and respective nuts which are not shown) passing through rows 64, 66 of mounting holes in front wall 24 and mounting plate 36.

The present invention has a motor 68 mounted on the top of the first housing member 22 and connected to a gear reduction train 70. The gear reduction train 70 is connected to drive a gear reducer adapter 72, including torque limiting means 74, and sliding shaft coupling 76, one end of which engages the stem 14 of the valve 10. A manually operated hand wheel 78 is operatively coupled to the gear reduction drive train 70 through clutch means 80. Pulling or pushing the hand wheel 78 will engage the clutch means 80 so that subsequent rotation of the hand wheel will drive the spindle 12 of the valve 10

The present invention further includes a monitoring assembly 82 adapted to measure the rotation of the valve stem 12 by monitoring the rotation of the motor and/or drive rain. This monitoring assembly can be selected from any of a number of well known devices, such as the Model 422 pressure transducer manufactured by A. B. B Kent Taylor of Rochester, N.Y. or the Temposonics linear displacement transducer system manufactured by MTS Systems Corporation of Research Triangle Park, N.C. In either instance the monitoring assembly 82 includes transducer means which convert the rotary motion of the motor 68 to linear motion which can be used for monitoring the setting of the subject device.

For example, using the above noted pressure regulator, as the motor 68 turns it drives an adjustment stem on the pressure regulator which in turn raises or lowers the regulator's output pressure which pressure is seen by the pressure transducer. This output is then calibrated in a range, for example 2 to 20 milliamps with one output representing a fully open condition for valve 10 and the other representing a fully closed condition. The motor 68 is then driven in response to this linear output to achieve the desired setting of valve 10.

The present invention is calibrated in the following manner. First the valve 10 is driven to a closed position by simply energizing the motor 68 for a sufficient time period to drive the throttling member of the valve to a fully closed position. This position of the valve is then be used to calibrate the monitoring means 82. The valve 10 is then driven to the fully open position and the monitoring means 82 again calibrated to note the fully opened position. It is then possible to set or reset the valve 10 at any desired position between the fully open and the fully closed positions by measuring the rotary movement of the motor 68 and/ or drive train 70, as sensed by the monitoring means 82.

In order to remotely operate the present invention, known means (not shown), such as conventional radio or microwave transmission means are used to send or relay an order to the remote location. Since the monitoring means 82 is calibrated and operates in a linear fashion, it is possible to energize the motor 68 in the desired direction and for a sufficient duration to drive the spindle 12 of valve 10 to the desired setting.

One advantage of the present invention over existing rotary actuators is that current devices are limited to a maximum of 360° degrees of rotation, which can limit fine control of a valve. The present invention can run continuously between the limits of the valve. The present invention can also be actuated manually, by simply engaging clutch means 80 and rotating the wheel 78, or in response to sensors in a control loop, or in response to remotely transmitted orders. It may be desirable, in offshore installations, to include an automatic shutdown feature that will be controlled by a flow meter which will give a command to the actuator control to shut the well in in response to sensing certain conditions. The well can then be brought back into production by remote control override when the sensed condition is no longer controlling. Thus the present invention can be utilized for remotely controlling valves and the like in such fashion a to obviate the necessity for production personnel to visit each valve to make an accurate setting or resetting thereof.

The present invention has a further advantage in that it can be added onto existing valves without requiring either valve replacement or system redesign. This retrofitting of the present invention provides substantial costs savings while allowing substantially immediate upgrading of an existing system. All that is necessary is to secure the semi cylindrical clamping portions 38, 46 together about one valve flange 18 thereby mounting the second housing member 34 on the valve. The first housing member 22 is adjusted and mounted on the second housing member by means of bolts 60, 62. Thus the invention can be installed without requiring system shutdown for any sustained period. A brief shutdown is required in order to calibrate the monitoring means.

The present invention may be subject to many modifications and changes without departing from the spirit or essential characteristics thereof. The present embodiment should therefor be considered in all respects as being illustrative and not restrictive as to the scope of the invention.

What is claimed is:

1. An apparatus for providing remote control of a rotary actuated device, such as a valve, choke or the like, having a throttling member moved within the device by a rotary driven spindle, said apparatus comprising:

a frame assembly adapted to be mounted on the device to be controlled and having a first frame member with a generally rectangular configuration open along a bias and a second frame member having a mounting plate, an upper semicylindrical clamp extending normal to one end of said plate, a lower image semicylindrical clamp, and means to join said semicylindrical clamps together about a portion of said rotary actuated device and means to adjustally secure said first and second frame members together;

drive means mounted on one end of said first frame member to drive the spindle of said device causing said throttling member to move between first and second positions, said drive means having power means, drive train means extending from said power means and operated thereby, and output means extending from said drive train means and connected to said spindle of said device;

monitoring means mounted on said frame assembly so as to monitor the rotational movement of said drive means;

means for energizing said drive means in response to demand for operation of said device, said energizing means being operatively associated with said monitoring means, whereby monitoring the rotational movement of said drive means allows said throttling member to be set and reset rapidly and with great accuracy and said drive train means to be deenergized in response to said monitoring means indicating that the device has reached a determined condition.

2. The apparatus according to claim 1 wherein said output means has means allowing relative axial movement with respect to said spindle while imparting rotary movement thereto.

3. The apparatus according to claim 1 wherein said output means has means providing for torque control.

4. The apparatus according to claim 1 wherein said monitoring means has a linear transducer.

5. The apparatus according to claim 1 wherein said monitoring means has a pressure transducer.

* * * * *